June 8, 1965  J. S. HICKMAN  3,188,458
LIGHTING AND HEAT TRANSFERRING APPARATUS
Filed Oct. 23, 1961  3 Sheets-Sheet 1
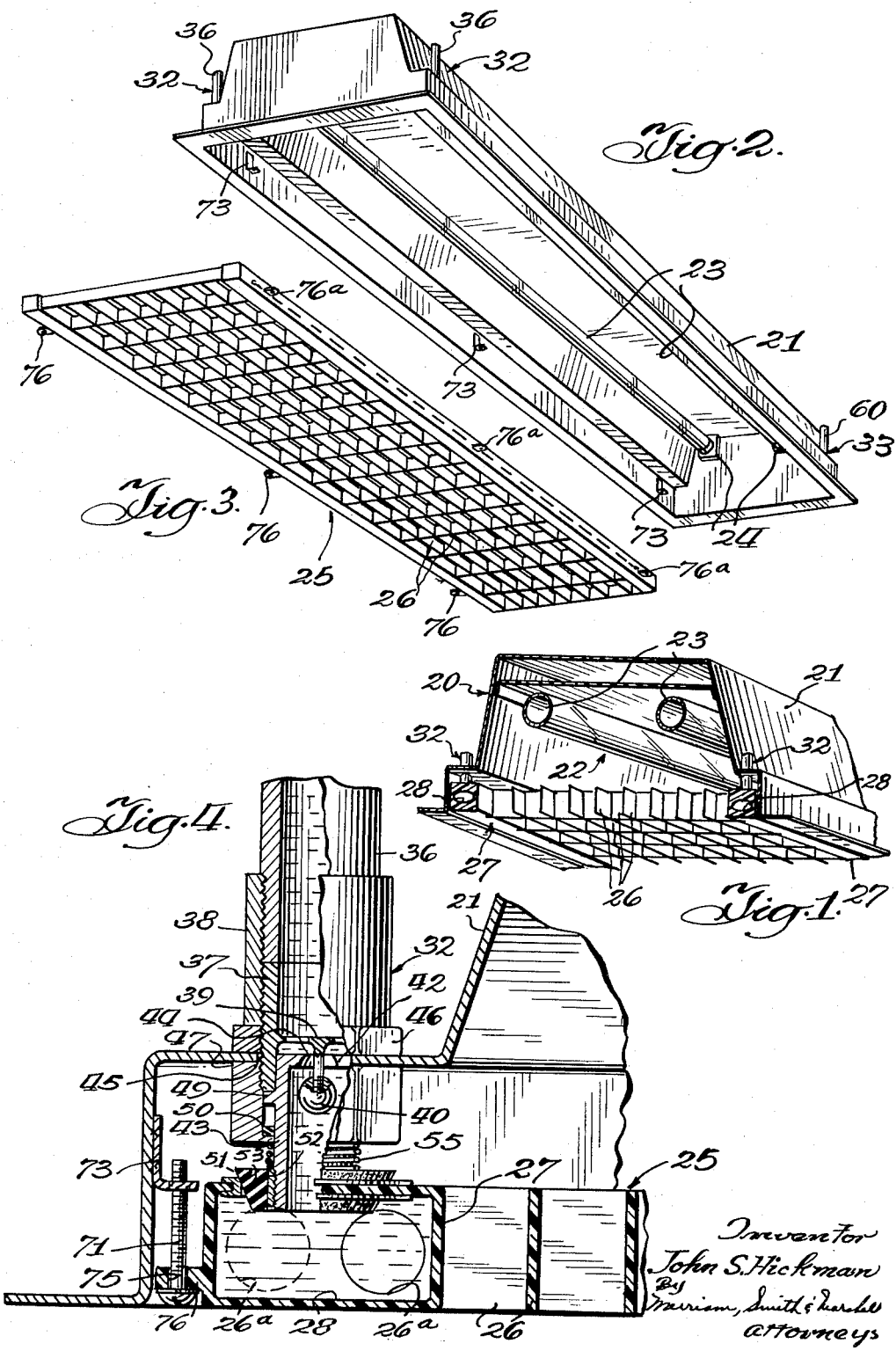
Inventor
John S. Hickman
By Merriam, Smith & Marshall
Attorneys June 8, 1965  J. S. HICKMAN  3,188,458
LIGHTING AND HEAT TRANSFERRING APPARATUS
Filed Oct. 23, 1961  3 Sheets-Sheet 2
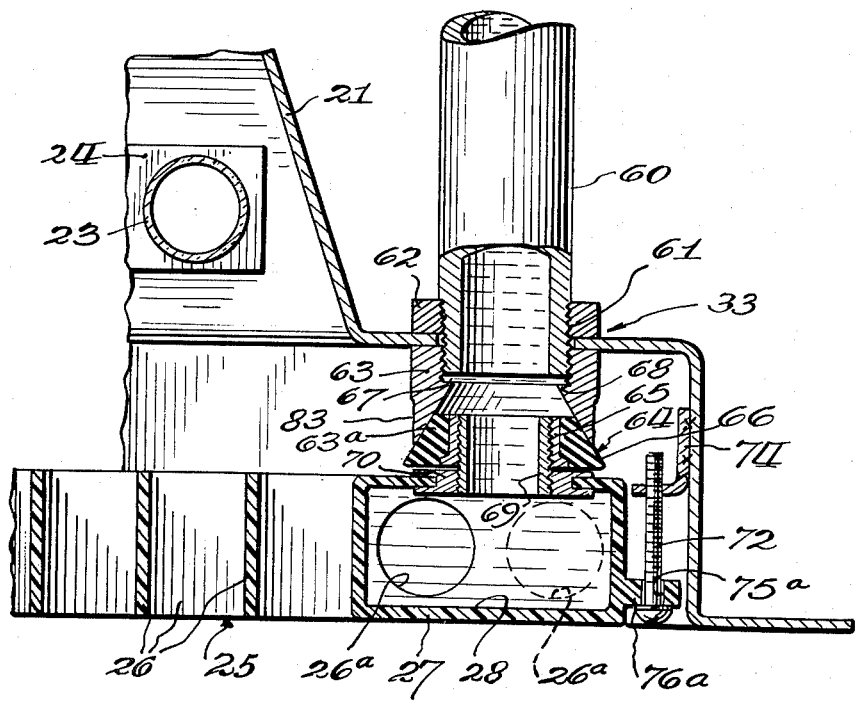
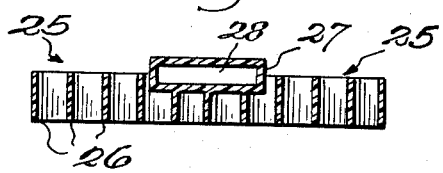
Inventor
John S. Hickman
By Merriam, Smith & Marshall
Attorneys

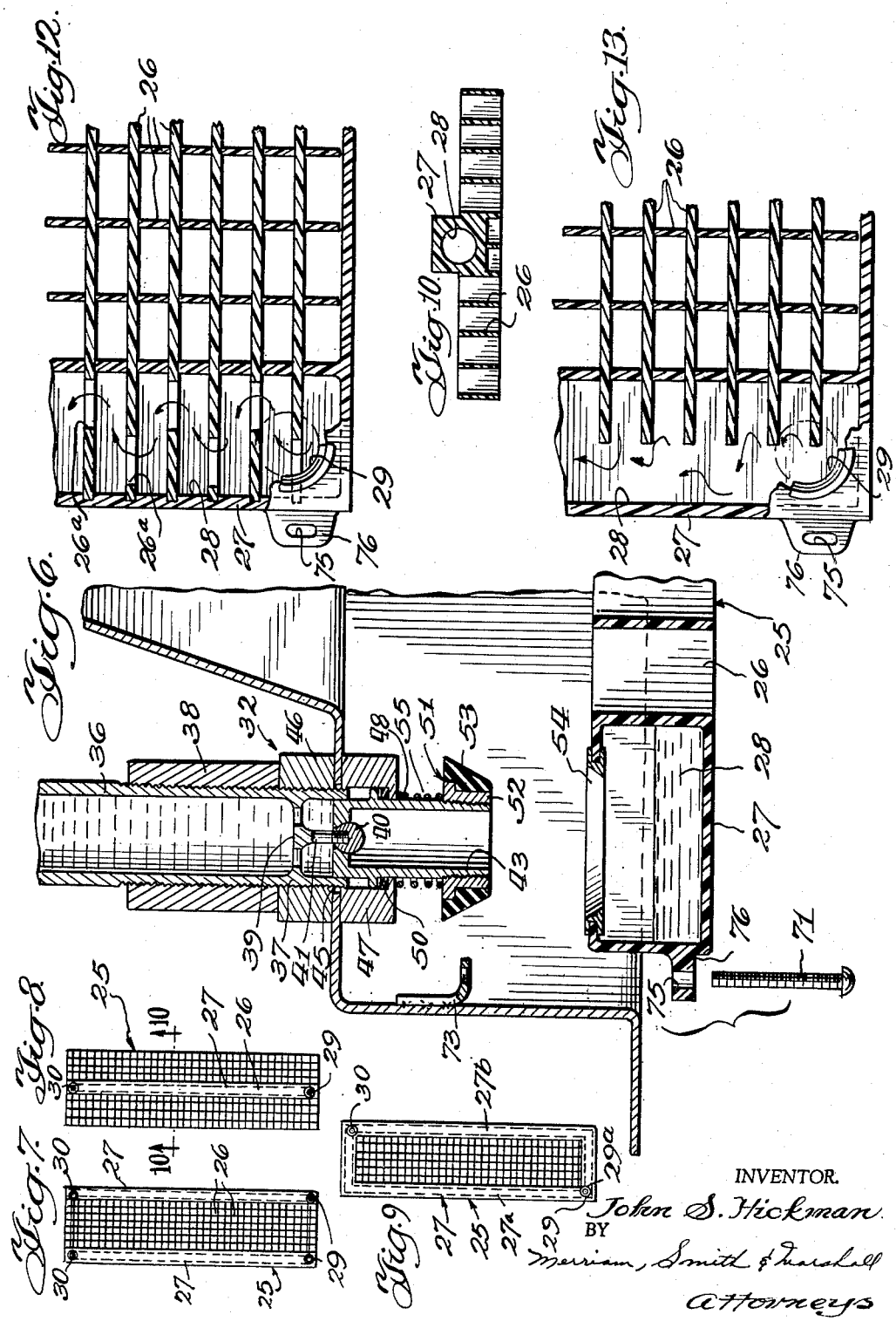

United States Patent Office 3,188,458
Patented June 8, 1965

3,188,458
LIGHTING AND HEAT TRANSFERRING
APPARATUS
John S. Hickman, Shorewood, Wis., assignor to Inland
Steel Products Company, Milwaukee, Wis., a corporation of Delaware
Filed Oct. 23, 1961, Ser. No. 146,994
6 Claims. (Cl. 240—9)

The present invention relates to a light transmitting and heat transferring apparatus and more particularly the invention relates to apparatus by which light energy is diffused before it is transmitted into an enclosure and through which a heat energy transfer medium is conducted for either removing the heat energy associated with the source of the light energy and from the enclosure or adding heat energy to the enclosure.

A considerable amount of heat energy is radiated by the lights employed for lighting enclosed spaces of a building. This radiant energy, if not removed by costly air conditioning equipment, is the source of discomfort to the occupants of the enclosed spaces at certain times in the year. Where the level of illumination is high and where high intensity lights are therefore provided, the air conditioning equipment must be sized large enough to remove the radiant heat energy emitted by the lights. When the invention is employed, the need for a great deal of costly refrigerated cooling medium is obviated and relatively high temperature cooling medium from, for example, a cooling tower, can be employed to effectuate the removal of unwanted heat energy.

Accordingly, the invention provides apparatus for removing the radiant heat energy emitted by the lights which are normally disposed in the ceiling of the enclosed space as well as from heat emitting bodies within the enclosure.

In addition, the same apparatus is employed to add heat energy to the enclosure when the need arises. When it is desired to heat the enclosure, the heat energy transfer medium is a heating medium, while when it is desired to remove the heat energy emitted by the lights and from the enclosure the heat energy transfer medium is a cooling medium.

The apparatus of the invention functions to transmit light into the enclosure and to trap and remove the heat emitted by the lighting means before the problem heat can be transmitted into the enclosure. The apparatus includes a heat energy transfer panel which extends across the entire area through which the light emitted by lighting means is transmitted into the enclosure, and since the path of the light is also the path of the heat energy, the heat energy is removed by the panel.

One of the features of the invention is that the apparatus takes the form of individual units which provide both lighting and cooling or heating of the enclosure. It is apparent therefore, that several of the apparatus can be selectively and conveniently positioned in the ceiling of the enclosure to afford the desired lighting and cooling or heating.

The heat energy transfer panel includes a plurality of light diffusing and heat transferring elements which are in heat exchange relationship with at least one header. A portion of the elements is imbedded into the header or headers as the case may be. Preferably the elements extend into a passage in the header. Accordingly, the sides of the elements are in direct contact with the heat transfer medium which passes through the header passage or passages. When the panel of the invention is employed to cool the enclosed space, heat energy emitted by the lighting means contacts the panel and heat is absorbed thereby. The heat energy absorbed by the panel is transferred from its light diffusing and heat transferring elements to its header or headers and is removed therefrom by the cooling medium which circulates around the sides or ends of the elements which are embedded in the header or headers. In the preferred embodiments shown in the accompanying drawings, the elements are in direct contact with the circulating heat transfer medium.

In the embodiments of the invention a portion of the elements project into the passage in the header. The heat energy transfer medium is in direct heat exchange relationship with the heat energy transfer medium. It is therefore apparent that very effective heat transfer to or from the heat transfer medium is obtained.

In one embodiment of the invention the elements project into and traverse the passage in the header. Alternately disposed apertures in adjacent elements cause the heat energy transfer medium to be conducted over a sinuous path through the header passage.

In the diagrammatic drawings:

FIGURE 1 is a cutaway perspective view of the lighting and heat transferring apparatus of the invention;

FIGURE 2 is a perspective view of an inverted trough-shaped support member which houses a light diffusing and heat transferring panel;

FIGURE 3 is a perspective view of the light diffusing and heat transferring panel;

FIGURE 4 is a fragmentary, cross-sectional view of the apparatus, showing inlet means for a heat energy transfer medium in the open position;

FIGURE 5 is a cutaway, cross-sectional view of the apparatus, showing outlet means for the heat energy transfer medium;

FIGURE 6 is a cutaway cross-sectional view of the apparatus like that of FIGURE 4 of the drawings but showing the inlet means in the closed position and showing the panel removed from the inlet means;

FIGURE 7 is a schematic view showing a header arrangement wherein plural headers are employed in a light diffusing and heat transferring panel;

FIGURE 8 is a schematic view showing a modified form of header arrangement;

FIGURE 9 is a schematic view showing another modified form of header arrangement;

FIGURE 10 is a cross-sectional view taken along line 10—10 of FIGURE 8;

FIGURE 11 is a cross-sectional view of a modification of the header shown in FIGURE 10;

FIGURE 12 is a fragmentary, cross-sectional view showing the manner in which the light diffusing and heat transferring elements are imbedded in the header and traverse the header passage; and FIGURE 13 is a fragmentary, cross-sectional view showing the manner in which the light diffusing and heat transferring elements of the arrangements of FIGURES 7 and 9 are imbedded in the header and extend into the header passage.

Referring now to the illustrative drawings, there is shown in FIGURE 1 a cutaway portion of a lighting and heat transferring apparatus generally indicated at 20. The apparatus 20 includes an inverted trough-shaped support member 21 which is employed to support the remaining components of the apparatus. Lighting means ordinarily and preferably take the form of fluorescent lamps 23 and ballasts (not shown). The lamps 23 are mounted in suitable conventional electrical receptacles 24 to which ballast leads (not shown) are connected.

A light diffusing and heat transferring panel 25 is mounted in the support member 21 beneath the lighting means 22. The panel 25 includes a plurality of light diffusing and heat transferring elements 26 which are shown as intersecting each other and further include a header arrangement wherein one or more headers 27 are provided into which the light diffusing and heat transferring elements 26 are imbedded. Various header arrangements are employable as shown in FIGURES 7, 8 and 9 of the drawings. Each header generally indicated at 27 has a passage 28 therein which is employed for conducting a heat transfer medium through the header 27. Each header 27 has an inlet opening 29 and an outlet opening 30 leading to the passage 28. In the embodiment of FIGURE 7 of the drawings, spaced parallel headers 27 are provided which are in heat exchange relationship with the elements 26. It is to be understood that although two spaced headers 27 are shown in FIGURE 7 of the illustrative drawings, additional headers can be provided, if desired, especially in the event that the elements 26 are of relatively low thermal conductivity and also where a relatively wide panel is employed, for example, to provide a luminous ceiling. In the modifications of FIGURES 8, 10 and 11 of the drawings, a single header 27 is shown disposed intermediate the side edges of the elements 26. In the modification of FIGURE 9 of the drawings the header 27 circumscribes all the side edges of the elements 26.

The elements 26 extend across the path of light transmission and therefore across the path through which the heat energy from the lighting means would be transmitted into the enclosure. When the heat energy transfer medium is a cooling medium, it is readily apparent that the heat energy is trapped by the light diffusing and heat transferring elements 26. The heat transferring elements receive radiant heat from objects within the enclosure. Since the air in the enclosure circulates into contact with the panel 25, the enclosure is also cooled by convection. When this heat energy transfer medium is a heating medium, the heat energy emitted by the lighting means is augmented by the heat energy delivered by the panel 25.

The heat energy transfer medium enters the inlet opening 29 of the header 27 from inlet means indicated generally at 32, while the heat energy transfer medium leaves the outlet opening 30 through outlet means indicated generally at 33. A heat energy transfer medium supply conduit 36 selectively conducts a heating medium or a cooling medium from suitable sources of supply into the inlet means 32. The conduit 36 is aligned with and communicates with a valve member 37. The valve member 37 is threaded on its outer periphery, and the conduit 36 and the valve member 37 are threadably coupled by a threaded union 38. The interior of the valve member 37 has a perforate web 39 which extends transversely thereof. A ball 40, threadably attached to a stem 41 which depends from the web 39, cooperates with a valve seat 42 and functions to close off the flow of the cooling medium when the panel 25 is disconnected from the inlet means 32. The valve seat 42 is made to correspond to the shape of the ball 40 which is adapted to seat thereagainst. A seat member 43 which contains the seat 42 is adapted to move longitudinally within the valve member 37 with respect to the ball 40. The heat energy transfer medium passes into the seat member 43 through an aperture 44 through which the stem 41 of the valve member 37 extends. The support member 21 has an aperture 45 therein through which the valve member 37 is adapted to protrude. A coupling nut 46 is threaded onto the valve member 37 and abuts the support member 21 on the one side thereof, while a coupling nut 47 is threaded onto the end of the valve member 37 on the other side thereof. The coupling nut 47 has a circumferentially extending internal flange 48. When the seat member 43 has moved into the position shown in FIGURE 6 of the drawings, the ball 40 is in seating contact with the seat 42 and a flange 49, which extends circumferentially around the outside of the seat member 43, is in abutment with a resilient seal 50. The resilent seal 50 prevents leakage of the heat energy transfer medium between the valve member 37 and the seat member 43.

A sealing element 51, which includes a threaded fitting 52 around which is adhesively secured an annular resilient seal 53, is threaded onto the end of the seat member 43 opposite the seat 42. The resilient seal 53 is tapered and corresponds to a tapered seat which forms a part of the cooling panel. When the panel 25 is in the position shown in FIGURE 4 of the drawings, a compression spring 55 which abuts the flange 48 and the fitting 52 acts to urge the sealing element 51 into sealing and seating relation with the seat element 54, while when the cooling panel 25 is in the position shown in FIGURE 6 of the drawings, the spring 55 has acted to move the seat member 43 longitudinally within the valve member 37 and hence cause the seat 42 to contact the ball 40 to cause the arrest of the flow of the heat energy transfer medium.

The outlet means 33 furnishes a path for the outlet of the heat energy transfer medium which has left the panel 25. An outlet conduit 60 extends through an aperture 61 in the support member 21. A coupling nut 62 is threaded onto the threaded end of the outlet conduit 60 and abuts the support member 21 on one side thereof, while a coupling nut 63 is threaded onto the extreme end of the outlet conduit 60 and abuts the support member 21 on the other side thereof. The coupling nut 63 is provided with an internal taper 63a which forms the seat for a sealing element 64. The sealing element 64 includes a threaded fitting 65 and a resilient seal 66 which extends circumferentially around the outside thereof. A resilient seal 67 is disposed between the end of the outlet conduit 60 and an internal circumferentially extending flange 68 on the coupling nut. The fitting 65 is internally threaded and receives a nipple 69. The nipple 69 is threadably received by a threaded fitting 70 which is disposed at the outlet opening of the return header 27.

As threaded fasteners 71 and 72 are threaded into angle members 73 and 74, respectively, the seat element 54 and the seal 53 of the inlet means 32 and the seat 63a and the seal 66 of the outlet means 33 are brought into sealing engagement, respectively. The end of the coupling nut 63 at which the taper 63a is disposed is externally threaded as indicated at 83 for purposes of placing a cap (not shown) thereon when the cooling panel is removed.

When the threaded fastener 71 is tightened, the spring 55 of the inlet means 32 is compressed and the valve seat 42 will separate from the ball 40 to permit the heat energy transfer medium to enter the header 27. Should it be required to remove the panel 25, for example to change a lamp 23, a ballast (not shown), or for other reasons, the threaded fasteners 71 and 72 are simply removed and the interior of the inverted trough-shaped support member is exposed. The fasteners 71 and 72 extend through elongated slots 75 and 75a in lugs 76 and 76a, respectively.

The elements 26 are imbedded into the header or headers 27, as the case may be, in order that effective heat transfer between the heat energy transfer medium and the panel 25 is achieved. Preferably the elements 26 extend into the passage 28 so that the heat energy transfer medium is in direct heat exchange relation with the elements 26.

In FIGURE 12 of the drawings, the elements are shown to extend into and traverse the passage 28. The elements 26 are shown to contain alternately disposed apertures 26a through which the heat energy transfer medium passes over a sinuous path.

In FIGURE 11 of the drawings, the passage 28 is shown to be relatively wide as compared with the width of the panel 25. This construction increases the amount of heat energy which is transferred by the panel 25 over for example the construction shown in FIGURE 10 of the drawings.

In the embodiment of FIGURE 9 of the drawings, the header 27 has two branches 27a and 27b each of which are provided with a common inlet 29 and a common outlet 30. A separator valve 29a insures that equal amounts of heat energy transfer medium flow in each branch 27a and 27b.

The light diffusing and heat transferring elements 26 can be composed of metals such as steel or aluminum or transparent or translucent plastics or glass. The headers, with the exception of the headers shown in FIGURES 8, 10 and 11, which are transparent or translucent, can be composed of an opaque material; but in all of the embodiments of the invention the headers can be composed of a transparent or translucent material.

An additive is preferably added to the heat energy transfer medium to prevent the metal components of the panel, if any, from corroding.

An additive is also preferably added to the heat energy transfer medium to increase its heat energy absorption.

The above-described embodiments being exemplary only, it will be understood that the present invention comprehends organizations differing in form or detail from the presently described embodiments. Accordingly, the invention is not to be considered as limited save as is consonant with the scope of the following claims.

What is claimed is:

1. Apparatus adapted for lighting and selectively cooling and heating an enclosure comprising a support member, lighting means mounted within said support member, and a heat energy transfer panel located in the path of light from said lighting means, said panel including at least one header having a passage through which a heat energy transfer medium is conducted, said panel including said header, being removably mounted on said support member beneath said lighting means and further including a plurality of light diffusing and heat energy transferring elements having portions thereof imbedded in and integral with said header.

2. Apparatus for transmitting light energy into an enclosure and for selectively removing the heat energy associated with the source of the light energy and adding heat energy to the enclosure, comprising means for lighting the enclosure, a heat energy transfer panel removably located in the path of light from said lighting means, said removable panel including at least one header having a heat energy transfer medium conducting passage and further including a plurality of light diffusing and heat energy transferring elements having a portion thereof imbedded in and integral with said header, and heat energy transfer medium inlet and outlet means leading into and out of said passage.

3. Apparatus for transmitting light into an enclosure and for selectively removing the heat energy associated with the source of the light energy and adding heat energy to the enclosure, comprising means for lighting the enclosure, a heat energy transfer panel removably located in the path of light from said lighting means, said removable panel including at least one header having a heat energy transfer medium conducting passage therein and a plurality of light diffusing and cooling elements embedded in and integral with said header, at least some of said element extending into said passage, wherein a heat energy transfer medium is passed into direct heat exchange relationship with said elements which project into said passage.

4. Apparatus for transmitting light into an enclosure and for selectively removing the heat energy associated with the source of the light energy and adding heat energy to the enclosure, comprising means for lighting the enclosure, a heat energy transfer panel removably positioned in the path of light from said lighting means, said removable panel including at least one header having a passage therein and a plurality of light diffusing and cooling elements embedded in and integral with said header and traversing said passage, said elements containing alternately disposed apertures through which a heat energy transfer medium is conducted over a sinuous path through said passage.

5. Apparatus adapted for lighting and selectively cooling and heating an enclosure comprising lighting means for lighting the enclosure, means for mounting said lighting means in a predetermined position in said enclosure, a heat transfer panel located in the path of light from said lighting means, said panel including a header having a heat energy transfer medium conducting passage and further including a plurality of light diffusing and heat energy transferring elements, said elements having a portion thereof embedded in and integral with said header, and means for removably supporting said panel, including said header, on said light mounting means.

6. Apparatus for transmitting light energy into an enclosure and for selectively removing the heat energy associated with the source of the light energy and adding heat energy to the enclosure comprising means for lighting the enclosure, a heat energy transfer panel located in the path of light from said lighting means, said panel including a header having a heat energy transfer medium conducting passage and further including a plurality of light diffusing and heat energy transferring elements, said elements having a portion thereof embedded in and integral with said header, heat energy transfer medium inlet and outlet means leading into and out of said passage, and valve means connecting said inlet means and said header for automatically stopping further flow of said heat transfer medium upon removal of said header and panel elements integral therewith.

References Cited by the Examiner

UNITED STATES PATENTS

| 1,647,943 | 11/27 | Updegrave et al. | 20—40.5 |
| 1,693,970 | 12/28 | Von Platen et al. | 165—179 |
| 2,432,308 | 12/47 | Goodyer | 165—179 |
| 2,710,336 | 6/55 | Jorn | 240—9 |
| 2,887,564 | 5/59 | Baran | 240—9 |
| 2,930,594 | 3/60 | MacCracken | 165—32 |

NORTON ANSHER, *Primary Examiner.*